United States Patent [19]

Lachowicz et al.

[11] 4,131,577

[45] Dec. 26, 1978

[54] REINFORCED PLASTIC COMPOSITIONS CONTAINING GRAFT COPOLYMERS

[75] Inventors: Donald R. Lachowicz, Fishkill; Charles B. Holder, Wappinger Falls, both of N.Y.

[73] Assignee: Texaco Inc., New York, N.Y.

[21] Appl. No.: 774,571

[22] Filed: Mar. 4, 1977

Related U.S. Application Data

[60] Division of Ser. No. 526,200, Nov. 22, 1974, Pat. No. 4,065,521, which is a continuation-in-part of Ser. No. 335,858, Feb. 26, 1973, abandoned, and Ser. No. 335,587, Feb. 26, 1973, abandoned.

[51] Int. Cl.$^2$ .................... C08L 9/00; C08L 23/00
[52] U.S. Cl. ..................... 260/17.4 CL; 260/42.14; 260/42.15; 260/42.17; 260/42.18; 260/42.46; 260/42.47; 260/42.52; 260/877; 260/878 R; 260/879; 428/375
[58] Field of Search ....... 260/878 R, 879 R, 17.4 CL, 260/42.14, 42.15, 42.17, 42.18, 42.46, 42.47, 42.52

[56] References Cited

U.S. PATENT DOCUMENTS

| | | | |
|---|---|---|---|
| 3,751,523 | 8/1973 | Lachowicz et al. | 260/877 |
| 3,862,105 | 1/1975 | Lachowicz et al. | 260/80.78 |
| 3,879,358 | 4/1975 | Lachowicz et al. | 260/80.78 |
| 3,886,233 | 5/1975 | Visseren | 260/878 R |

*Primary Examiner*—Richard B. Turer
*Attorney, Agent, or Firm*—Carl G. Ries; Thomas H. Whaley; Walter D. Hunter

[57] ABSTRACT

Acrylate graft copolymers prepared in a two-stage process by first reacting a backbone polymer, such as 1,2-polybutadiene, an alkylidene norbornene polymer or an ethylene/propylene/alkylidene norbornene terpolymer, with, for example, a mixture of dinitrogen tetroxide and oxygen to form a nitrooxidized polymer having incorporated therein nitro and peroxy nitrate functions which serve, in the second stage of the process, as sites for the subsequent graft polymerization of an acrylate monomer are disclosed. The thus-formed graft copolymers comprise from about 5 to about 80 weight percent of the backbone polymer with the balance being furnished by the acrylate monomer.

4 Claims, No Drawings

REINFORCED PLASTIC COMPOSITIONS CONTAINING GRAFT COPOLYMERS

This application is a division of application Ser. No. 526,200, filed Nov. 22, 1974, now U.S. Pat. No. 4,065,521, issue date Dec. 27, 1977, which in turn was a continuation-in-part of application Ser. No. 335,858, filed Feb. 26, 1973, now abandoned, and of application Ser. No. 335,857, filed Feb. 26, 1973, now abandoned.

BACKGROUND OF THE INVENTION

1. Field of the Invention

This invention relates to graft copolymers and, in particular, to graft copolymers in which an acrylate is grafted onto a dissimilar backbone polymer.

2. Description of the Prior Art

The preparation of a wide variety of graft copolymers has been described in the art. For example graft copolymers can be prepared as described in U.S. Pat. No. 3,507,932 by oxidizing a methacrylic homopolymer, such as isopropyl methacrylate, with air to form a hydroperoxide derivative and then reacting the said derivative with a high molecular weight methacrylate ester thus forming a graft copolymer.

One object of this invention is to provide a graft copolymers by copolymerizing an unsaturated hydrocarbon polymer previously treated with dinitrogen tetroxide or a mixture of dinitrogen tetroxide and oxygen to form reactive sites therein, with an acrylate monomer.

Another object of this invention is to graft an acrylate monomer to a dissimilar backbone polymer while avoiding crosslinking.

BRIEF SUMMARY OF THE INVENTION

The novel graft copolymers of this invention comprises a backbone polymer leaving a hydrocarbon chain portion and a plurality of pendant hydrocarbon groups each containing a moiety of the formula:

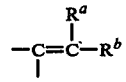

where $R^a$ and $R^b$ are independently selected from the group consisting of hydrogen and alkyl of from 1 to 16 inclusive carbon atoms, having grafted thereon an acrylate of the formula:

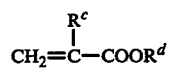

wherein $R^c$ is hydrogen or alkyl of from 1 to 3 inclusive carbon atoms and $R^d$ is alkyl of from 1 to 30 inclusive carbon atoms.

The graft copolymers of this invention may be prepared by (1) first reacting, for example, an ethylene/propylene/alkylidene norbornene terpolymer with dinitrogen tetroxide to form a nitrated backbone polymer having incorporated therein nitro and nitrite functions which serve, in the second stage of the process, as sites for the subsequent graft copolymerization of an acrylate monomer or a mixture of acrylate monomers or (2) by first reacting, for example, an ethylene/propylene/alkylidene norbornene terpolymer, with a mixture of dinitrogen tetroxide and oxygen to from a nitrooxidized backbone polymer having incorporated therein nitro and peroxy nitrate functions which serve, in the second stage of the process, as sites for the subsequent graft polymerization of an acrylate monomer or a mixture of acrylate monomers.

The thermoplastic copolymers of this invention, which can be extruded or molded, can be utilized to prepare sheet, rod, housings for radios, signal lights lenses, etc. A wide variety of glass and asbestos fiber reinforced plastic compositions which exhibit excellent mechanical properties can be prepared using the copolymers of this invention.

DETAILED DESCRIPTION OF THE INVENTION

The graft copolymer of this invention can be prepared by:

(A) contacting an ethylene/propylene/5-alkylidene-2-norbornene backbone terpolymer wherein the alkylidene group has from 1 to 16 carbon atoms with dinitrogen tetroxide to form a nitrated intermediate backbone polymer product having incorporated therein nitro and nitrite groups, (i.e., —ONO) and (B) reacting the said intermediate backbone polymer product with an acrylate of the formula:

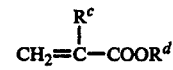

wherein $R^c$ is selected from the group consisting of hydrogen and alkyl of from 1 to 3 inclusive carbon atoms and $R^d$ is alkyl of from 1 to 30 inclusive carbon atoms.

Another method for preparing the graft copolymers of this invention comprises:

(A) contacting an ethylene/propylene/5-alkylidene-2-norbornene backbone terpolymer, wherein the said alkylidene group has from 1 to 16 carbon atoms, with a mixture of dinitrogen tetroxide and oxygen to form an intermediate backbone polymer product having incorporated therein nitro and peroxy nitrate groups, and (B) reacting the said intermediate backbone polymer product with an acrylate of the formula:

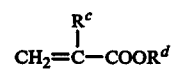

wherein $R^c$ is selected from the group consisting of hydrogen and alkyl of from 1 to 3 inclusive carbon atoms and $R^d$ is alkyl of from 1 to 30 inclusive carbon atoms.

THE NITRATION PROCESS FOR PREPARING GRAFT COPOLYMERS

In one method for preparing the graft copolymers of this invention, i.e., the nitration process, in the first stage reaction, the backbone polymer is contacted with dinitrogen tetroxide (sometimes after prepurging the reaction system with an inert gas, such as nitrogen, to remove oxygen) to form a nitrated intermediate polymeric product containing both nitro and nitrite functions. In the resulting product the nitro and nitrite groups form on either olefinic carbon when both of the latter have the same number of hydrogen atoms attached, and when the olefin group is terminal, the nitro group attaches itself to the terminal olefinic carbon. In a substantial number of the recurring units of the backbone polymer a nitro group adds on to each of the olefinic carbon atoms.

The intermediate polymeric compound, i.e., the nitrated backbone polymer is formed in the first stage of the process of this invention when dinitrogen tetroxide is reacted with a terpolymer having for example, methylene-2-norbornene units, yield intermediate polymeric products containing units of the formula:

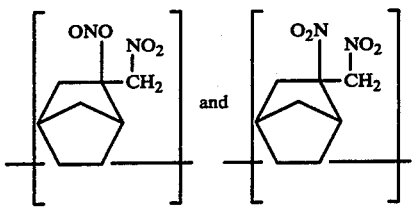

The reaction temperature employed is advantageously between −30° and 20° C. Higher reaction temperatures tend to facilitate the decomposition of the nitrated product and at temperatures below the prescribed range the dinitrogen tetroxide will not function due to its inability to disassociate into monomeric nitrogen dioxide.

The amount of dinitrogen tetroxide utilized in the first stage which can be varied over a wide range generally will be from about 0.00001 to 0.01 mole per gram of the backbone polymer charged to the reactor: the actual amount employed depends on the C≡C equivalents/-grams of backbone polymer desired to be reacted. The dinitrogen tetroxide may be introduced into the reactor in liquid form although preferably it is added as a gas and usually in admixture with an inert gas such as nitrogen, argon, etc. The reaction time is normally between about ½ and 10 hours although longer or shorter periods may be employed.

It is to be noted that the nitrating agent, dinitrogen tetroxide, is actually an equilibrium mixture of dinitrogen tetroxide and nitrogen dioxide with the equilibrium being driven to essentially 100% nitrogen dioxide at 140° C. Under advantageous conditions, the nitrating agent is normally introduced into the reaction system at a rate of between about 0.002 and 0.2 gram/min/gram of backbone polymer, however, the actual rate depends in large measure upon the rate of heat removal from the reaction system. To promote contact of the reactants in the first stage, the reaction is desirably carried out under conditions of agitation in the presence of an inert liquid diluent, for example, inert liquids having a boiling point between about 30° and 100° C., such as n-hexane, n-heptane, carbon tetrachloride and diethyl ether.

Terpolymer of the 5-alkylidene-2-norbornenes are highly useful as backbone polymers in preparing the graft copolymers of this invention by both the nitration and nitrooxidation processes. These polymeric materials are copolymers of ethylene, propylene, and 5-alkylidene-2-norbornene, the said terpolymer having an iodine number between 2 and 60 and containing by weight of about 20 to 76.4 propylene, and about 3.6 to 20 percent 5-alkylidene-2-norbornene monomer units.

Representative examples of such terpolymers include: ethylene/propylene/5-methylidene-2-norbornene ethylene/propylene/5-ethylidene-2-norbornene; ethylene/propylene/5-isobutylidene-2-norbornene; ethylene/propylene/5-n-heptylidene-2-norbornene; ethylene/propylene-5-isoheptylidene-2-norbornene; ethylene/propylene/5-n-decyoidene-2-norbornene; ethylene/propylene/5-n-dodecylidene-2-norbornene; ethylene/propylene/5-n-tridecylidene-2-norbornene; ethylene/propylene/5-n-tetradecylidene-2-norbornene and ethylene/propylene/5-hexadecylidene-2-norbornene. Mixtures of the terpolymers may be used, if desired.

Preparation of the above-described terpolymers can be accomplished as set forth in U.S. Pat. No. 3,151,173 by contacting ethylene, at least one alpha-olefin, and at least one 5-alkylidene-2-norbornene in solution in inert solvents with coordination catalysts, at temperatures between −20° and 70° C. at atmospheric, subatmospheric, or superatmospheric pressure and in the absence of catalyst poisons such as oxygen, water, and carbon dioxide.

In the second stage, the grafting of acrylate monomer takes place at the site of nitrite (—ONO) attachment through the mechanism of a free radical polymerization. The nitrated intermediate polymer product formed in the first stage thus provides not only the sites for the graft polymerization but also the free radicals necessary to initiate the polymerization of the acrylate monomer.

After the first stage reaction has been completed and the unsaturated polymer having nitro and nitrite groups incorporated therein has been formed, and if the system previously had not been placed under an inert atmosphere an inert purge gas such as nitrogen, preferably, is passed through the reaction mixture and continued until any oxygen has been removed. The acrylate monomer, which may be dissolved in an inert solvent such as ether, n-hexane or benzene, etc. if desired, is then added to the polymer solution after the monomer or its solution has been purged with an inert gas. Acrylate monomers useful in preparing the oil-soluble graft copolymers by both of the processes set forth, i.e., nitration and nitrooxidation have the formula:

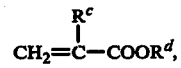

wherein $R^c$ is hydrogen or alkyl of from 1 to 3 inclusive carbon atoms as exemplified by methyl, ethyl, propyl and isomers thereof, and $R^d$ is alkyl of from 1 to 30 inclusive carbon atoms as exemplified by methyl, ethyl, propyl, butyl pentyl, hexyl, octyl, nonyl, decyl, undecyl hexadecyl, heptadecyl, octadecyl, nonadecyl, eicosyl, docosyl, pentacosyl, and isomers thereof. Mixtures of these acrylates may be employed, if desired.

In the second stage, in which graft copolymerization takes place, the reaction mixture is heated to decompose the nitrite sites in the backbone polymer. Generally the reaction mixture is heated to a temperature of from about 35° to about 175° C. and, preferably, at a temperature of about 80° to about 130° C. The second stage reaction may be conducted under refluxing conditions. Heating is continued until the desired degree of graft polymerization has been accomplished. The course of the reaction can be followed by measurement, for example, of the refractive index of the mixture or by determining some other easily measurable physical property.

The extent of the grafting achieved is directly dependent on the extent of the nitrite formation. One skilled in the art can prepare the desired graft copolymer by carefully selecting the necessary reaction conditions, such as time, temperature, etc. in the first and second stages of the process of this invention.

Recovery of the product from the reaction mixture can be accomplished by a variety of methods well known in the art such as by the addition of methanol or acetone to precipitate the product which can be recovered by decantation, centrifugation, filtration, etc. and the crude polymer can be redissolved in a suitable solvent such as chloroform, benzene or toluene, etc. and reprecipitated in purified form by addition of methanol or acetone to the polymer solution.

A relatively small amount of dinitrogen tetroxide should be used in the first stages when backbone polymers of the ethylene/propylene/5-ethylidene-2-norbornene type is employed (i.e. about 0.00001 to about 0.001 mole of dinitrogen tetroxide/g of polymer of less.

The backbone polymers utilized in forming the novel graft copolymers by the nitration and nitrooxidation processes generally will have molecular weights of from about 5000 to 200,000 or more and preferably, from about 10,000 to about 150,000. The final graft copolymer products will have molecular weights of from about 6500 to about 1,000,000 or more and, preferably, from about 15,000 to about 250,000.

Generally, the backbone polymer will make up about 5 to about 80 or higher and, preferably, from about 10 to about 40 percent by weight of the final graft copolymer, the balance being furnished by the monomer which is grafted and polymerized onto the nitrated backbone polymer.

The preparation of the oil-soluble graft copolymers of a methacrylate ester and an ethylene/propylene/diene terpolymer by the nitration method is more fully described in U.S. Pat. No. 3,751,522, which is incorporated herein in its entirety.

The following examples illustrate the preparation of various oil-soluble graft copolymers of a methacrylate ester and an ethylene/propylene/alkylidene norbornene terpolymer.

EXAMPLE I

Graft Copolymer of Butyl Methacrylate on Nitrated Ethylene/Propylene/5-Ethylidene-2-Norbornene Terpolymer Into a resin kettle equipped with a reflux condenser, a thermometer, a mechanical stirrer, and a gas inlet tube were placed 5.0 g of an ethylene/propylene/5-ethylidene-2-norbornene terpolymer marketed by Copolymer Rubber and Chemical Corporation under the trademark EPsyn 40-A (molecular weight 76,000, raw Mooney viscosity (ML-8' at 250° F.) 40, specific gravity 0.86, gel content-none) and n-heptane (160 ml). The mixture was stirred at room temperature until the polymer dissolved following which the solution was cooled to the temperature of an ice bath. The gas inlet tube was connected to a graduated container of liquid dinitrogen tetroxide; a stream of nitrogen (at a rate of 60.8 ml/min (STP) was passed over the dinitrogen tetroxide and the resultant gaseous mixture ($N_2O_4/N_2$) was conducted into the reaction solution (at ice bath temperature) through the gas inlet tube. One-tenth milliliter of liquid dinitrogen tetroxide was transferred to the reaction solution in this manner over a period of 47 min. Unreacted dinitrogen tetroxide was purged from the reaction solution with a stream of nitrogen. Butyl methacrylate (50 ml) was added to the reaction solution and approximately 90 ml of solvent was stripped off under vacuum to concentrate the reactants. The reaction solution was subsequently heated at about 60° and 80° C. for 2 and 4 hrs. respectively. After dilution with benzene (100 ml) to lower the viscosity and after methanol (400 ml) was added, the graft copolymer product precipitated from the solution. To the resulting mixture there was added 1500 ml of additional methanol with mixing following which the graft copolymer was separated by decantation. The product was dissolved in 200 ml of benzene and reprecipitated by addition of 1000 ml of methanol (to remove unreacted monomer) and afterwards dried in vacuo. The weight of the dry polymer was 18.1 g.

A sample of a graft copolymer product prepared with EPsyn 40-A and butyl methacrylate in the same manner as in Example I (0.810 g), calculated to contain 0.25 g. of EPsyn 40-A, was dissolved in benzene (30 ml). Acetone (90 ml) was slowly added to this solution resulting in precipitation of an acetone-insoluble fraction amounting to 0.103 g. A similar procedure with 0.250 g of EPsyn 40-A resulted in precipitation of 0.228 g. In addition, an infrared spectrum of the acetone-insoluble fraction of the product indicated that it contained an appreciable amount of poly (butyl methacrylate) which as a homopolymer is acetone-soluble. These tests indicate that a true graft copolymer had been prepared.

EXAMPLE II–VIII

A number of additional graft polymerization runs were conducted in the same manner as described in Example I above. Pertinent details relating to these examples are presented in Table 1.

TABLE 1

Graft Copolymerization with Nitrated Ethylene/Propylene/5-Ethylidene-2-Norbornene Terpolymer[a]

| Example No. | Methacrylate Ester (ml) | Solvent (ml) | Temp. (° C)/ Time (hr.) | Polymer Weight Increase Percent |
|---|---|---|---|---|
| II[b] | Methyl (100) | Hexane (70) | 60/4.5 | 744 |
| III[b] | Methyl (100) | Hexane (70) | Room Temp/30.5 | 1172 |
| IV[b] | Butyl (100) | Hexane (100) | 75/5 | 312 |
| V[b] | Lauryl (100) | Hexane (100) | 80/7 | 400 |
| VI[b] | Methyl (100) | Hexane (70) | 60/4.5 | 620 |
| VII[b] | Methyl (100) | Hexane (60) | 60/3.1 | 160 |
| VIII[c] | Butyl (150) | Hexane (160) | 60/2; 80/4 | 262 |

[a] In preparing the nitrated terpolymer 0.1 ml (liquid) dinitrogen tetroxide was slowly transferred as a gas mixed with nitrogen into a solution of 5.0 g. of the backbone polymer.
[b] Backbone terpolymer, an ethylene/propylene/5-ethylidene-2-norbornene terpolymer marketed by Copolymer Rubber and Chemical Corporation under the tradename EPsyn 55, molecular weight about 90,600 raw Mooney viscosity (ML-8' at250° F) 55, specific gravity 0.86, gel content-none).
[c] Backbone terpolymer - EPsyn 40-A (See Example I for description).

EXAMPLES IX–XI

In this series the grafting of butyl methacrylate, lauryl methacrylate and a mixture of lauryl methacrylate, and butyl methacrylate respectively, to an ethylene/propylene/5-ethylidene-2-norbornene terpolymer having a molecular weight of about 76,000 (EPsyn 40-A) was demonstrated. The nitration step (first stage reaction) was conducted by stirring a solution of the polymer (9.4 weight percent in heptane) with dinitrogen tetroxide (about $4.0 \times 10^{-4}$ mole per gram of polymer) for three hours at 0°–5° C. under a nitrogen atmosphere. The acrylate monomer, which had been purged with nitrogen, was added to the reaction solution; the resultant mixture was heated to bring about the second stage polymerization and graft reaction. Recovery of the graft copolymer was accomplished by adding methanol to the reaction mixture to precipitate the graft copolymer which was purified by dissolution in benzene and re-precipitation with methanol. Other pertinent details relating to these three examples are found in Table 2.

TABLE 2
METHACRYLATE GRAFT COPOLYMERS
Graft Conditions

| Run No. | Monomer[1] | Temp (°C) | Time (hr) | Conversion (Percent) | Polymer Weight Increase Percent |
|---|---|---|---|---|---|
| IX | BMA | 100 | 7 | 12.2 | 110 |
| X | LMA | 100 | 7 | 7.5 | 65 |
| XI | LMA-BMA[2] | 80 | 5 | 7.1 | 63 |

[1] BMA and LMA stand for butyl and lauryl methacrylate respectively.
[2] LMA-BMA molar ratio of 1.47:1.

EXAMPLE XII

Into a resin kettle equipped with mechanical stirrer, thermocouple well, gas inlet tube, and reflux condenser were placed EPsyn 55 (a commercially available ethylene-propylene-ethylidene-2-norbornene terpolymer of molecular weight 91,000) (5.0 g) and n-hexane (160 ml). The polymer was allowed to dissolve, the system was placed under nitrogen, and the solution was cooled to 0° C., and 0.1 ml of $N_2O_4$ (liquid measure) was transferred to the solution. After 5 minutes, 50 ml. of lauryl methacrylate was added to the solution. Approximately 60 ml. of solvent was stripped from the solution with vacuum and an additional 50 ml. of lauryl methacrylate was added. The solution was heated at 60° C. for 6.5 hours. The graft copolymer product (13.8 g., after drying in vacuo) was precipitated from the solution by addition of methanol (1200 m.).

THE NITROOXIDATION PROCESS FOR PREPARING THE GRAFT COPOLYMER

In the second method for preparing the oil-soluble graft copolymers useful as viscosity index improvers of this invention, the backbone polymer in the first stage reaction is contacted simultaneously with a mixture of dinitrogen tetroxide and oxygen to form an intermediate polymeric product containing both nitro and peroxy nitrate functions. It is to be noted that the nitro and peroxy nitrate groups form on either olefinic carbon when both of the latter have the same number of hydrogens attached and the intermediate product is actually a mixture of compounds. When the olefin group is terminal, the nitro group attaches itself to the terminal olefinic carbon.

The intermediate polymeric compound, i.e., the nitrooxidized backbone polymer, is formed in the first stage of the nitrooxidation process when a mixture of dinitrogen tetroxide and oxygen is reacted with a backbone polymer having, for example, recurring 5-methylene-2-norbornene units to yield an intermediate product containing units of the formula:

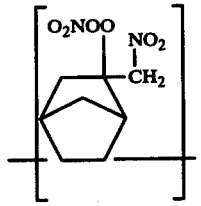

The reaction temperature employed is advantageously between about −30° and 20° C. Higher reaction temperatures tend to facilitate the decomposition of the peroxy nitrate product and at temperatures below the prescribed range the dinitrogen tetroxide would not function due to its inability to disassociate into monomeric nitrogen dioxide.

The amount of dinitrogen tetroxide employed in the first stage which can be varied over a wide range generally will be from about 0.00001 to about 0.01 mole per gram of the backbone polymer charged to the reactor; the actual amount employed depends on the $C=C$ equivalents/gram of backbone polymer desired to be reacted. The reactant mole ratio of dinitorgen tetroxide to oxygen utilized is normally between about 0.5:1 and 0.005:1. However, the important aspect of the reactant ratio of this mixture is that the moles of oxygen be at least equivalent and preferably in excess to the moles of dinitrogen tetroxide. If the ratio of $N_2O_4$ is above that of oxygen another $NO_2$ group forms rather than the desired peroxy group. Excess oxygen even in excess of the stated range does not deleteriously affect the reaction.

The oxygen employed may be in the pure form or in the diluted form such as air or in admixture with inert gases such as nitrogen and argon. Under advantageous conditions the oxygen is introduced into the reaction system at a rate of between about 0.1 and 100 mls. (STP)/min/gram of backbone polymer. The reaction time is normally between about ½ and 10 hours although longer or shorter periods may be employed.

It is to be noted that the nitrating agent, dinitrogen tetroxide, is actually an equilibrium mixture of dinitrogen tetroxide and nitrogen dioxide with the equilibrium being driven to essentially 100% nitrogen dioxide at 140° C. Under advantageous conditions, the nitrating agent is normally introduced into the reaction system at a rate of between about 0.002 and 0.2 gram/min/gram of backbone polymer; however, the actual rate depends in large measure upon the rate of heat removal from the reaction system.

To promote contact of the reactants in the first stage, the reaction is desirably carried out under conditions of agitation in the presence of an inert liquid diluent, for example, inert liquids having a boiling point between about 30° and 100° C. such as n-hexane, n-heptane, carbon tetrachloride and diethylether.

Terpolymers of ethylene/propylene/alkylidene-2-norbornenes are highly useful as backbone polymers in the process of this invention. Suitable terpolymers of this type have been described in detail above.

In the second stage of the nitrooxidation process the grafting of an acrylate monomer takes place at the peroxy nitrate sites through the mechanism of a free radical polymerization. The intermediate polymer product formed in the first stage thus provides not only the sites for the graft polymerization but also the free radicals necessary to initiate the polymerization of the acrylate monomer.

After the first stage reaction has been completed and the unsaturated polymer having nitro and peroxy nitrate groups incorporated therein has been formed, an inert purge gas such as nitrogen is passed through the reaction mixture and continued until any dissolved oxygen has been removed. The acrylate monomer, which may be dissolved in an inert solvent such as ether, n-hexane or benzene, etc., if desired, is then added to the polymer solution either before or after the inert purge gas sweep is commenced.

In the second stage, in which apparently graft copolymerization takes place, the reaction mixture is heated to decompose the peroxy nitrate sites in the backbone polymer. Generally the reaction mixture is heated to a temperature of from about 35° to about 175° C. and, preferably, at a temperature of about 80° to about 130° C. The second stage reaction may be conducted under refluxing conditions. Heating is continued until the desired degree of graft polymerization has been accomplished. The course of the reaction can be followed by measurement, for example, of the refractive index of the mixture or by determining some other easily measurable physical property.

The extent of the grafting achieved is directly dependent on the extent of the peroxy nitrate formation. One skilled in the art can prepare the desired graft copolymer by carefully selecting the necessary reaction conditions, such as time, temperature, etc. in the first and second stages of the process of this invention.

Recovery of the product from the reaction mixture in the nitrooxidation process can be accomplished by a variety of methods well known in the art as by the addition of methanol or acetone to precipitate the product which can be recovered by decantation, centrifugation, filtration, etc. or the crude polymer can be redissolved in a suitable solvent such as chloroform, benzene or toluene, etc. and re-precipitated in purified form by addition of methanol or acetone to the polymer solution. Fractional precipitation may be utilized to identify the final polymer as a true graft polymer of the backbone polymer and the acrylate.

A relatively small amount of dinitrogen tetroxide should be used in the first stage when backbone polymers of the ethylene/propylene/5-ethylidene-2-norbornene type is employed (i.e., about 0.00001 to about 0.001 mole of $N_2O_4$ per g. of polymer or less). Also, it has been found advantageous to add the acrylate within about 1 to about 10 minutes after the nitrogen tetroxide first stage reaction has been completed.

The preparation of the graft copolymers of this invention by the nitrooxidation process is more fully described in U.S. Pat. No. 3,751,523 which is incorporated herein in its entirety.

EXAMPLE XIII

Graft Copolymer of Butyl Methacrylate on an Ethylene/Propylene/5-Ethylidene-2-Norbornene Terpolymer Into a resin kettle equipped with a reflux condenser, a thermometer, a mechanical stirrer, and a gas inlet tube were placed 5.0 g. of ethylene/propylene/5-ethylidene-2-norbornene terpolymer marketed by Copolymer Rubber and Chemical Corporation under the trademark EPsyn 40-A (molecular weight 76,000, raw Mooney viscosity (ML 8' at 250° F.) 40, specific gravity 0.86, gel content-none) and 70 ml of n-heptane.

The mixture was stirred at room temperature until polymer dissolved, following which the solution was cooled to ice bath temperature while purging it with oxygen (2 hrs) Gaseous dinitrogen tetroxide (15.0 ml-STP) was injected into the solution with a hypodermic syringe and after stirring for 5 minutes, the oxygen in the system was replaced with nitrogen by evacuating the system and refilling it with nitrogen four times. Butyl methacrylate (50 ml) was added to the reaction solution (13 mins. after the addition of the dinitrogen tetroxide). The solution was subsequently heated at 80° C. for 5 hours, after which it was diluted with benzene (100 ml) to decrease the viscosity of the solution. Methanol (400 ml) was added dropwise causing the graft copolymer formed to precipitate. The mixture was stirred with an additional 1500 ml of methanol and the polymeric product was separated. The product was dissolved in benzene (200 ml) and re-precipitated by addition of 1000 ml of methanol in order to remove unreacted monomer and finally dried in vacuo. The weight of the graft copolymer recovered was 14.7 g.

A sample of the product (0.735 g), calculated to contain 0.25 g. of the initial terpolymer was dissolved in benzene (30 ml). Acetone (90 ml) was slowly added to this solution, resulting in precipitation of an acetone-insoluble fraction amounting to 0.096 g. A similar procedure with 0.250 g. of the initial terpolymer resulted in precipitation of 0.228 g. In addition, by infrared analysis it was shown that the acetone-insoluble fraction of the product contained an appreciable amount of polybutyl methacrylate which as a homopolymer is acetone-soluble.

EXAMPLES XIV-XVII

A number of additional runs were conducted in the same manner as described in Example XIII above. Pertinent details relating to these examples are presented in Table 3.

TABLE 3

| | NITROOXIDATION OF POLYMERS AND GRAFT REACTIONS | | | | | |
|---|---|---|---|---|---|---|
| | | | Vol. Liq. | | Graft Reaction[b] | |
| Example | Polymer(g) | Solvent (ml) | $N_2O_4$ ml[a] | Monomer(ml) | Temp. (° C)/Time(hr) | Prod. (g) |
| XIV | EPsyn 55[d](5.0) | Toluene (160) | 0.1 | MMA[c](30) | RT/16.3; 60/7 | 7.1 |
| | A 5 ml sample of reaction solution taken at commencement of 60° C heating yielded 0.15 g. of polymer. | | | | | |
| XV | EPsyn 40-A[e](5.0) | Toluene (160) | 0.1 | MMA[c] (30) | 60/7 | 7.0 |
| | Reaction solution began to gel within 1 min. of MMA addition and 50 ml. of benzene was added. | | | | | |
| XVI | EPsyn 40-A[e] (5.0) | n-Heptane(70) | 15 (gas) | BMA[f](50) | 80/5 | 12.6 |
| | Lubrizol 817 (0.05 g) was added to polymer solution (200 ml. benzene) prior to last precipitation used to inhibit crosslinking on standing. | | | | | |
| XVII | EPsyn 40-A[e](5.0) | n-Heptane(70) | 15 (gas) | BMA[f](50) | 90/5 | 16.9 |
| | 0.05 g. of Lubrizol 817 added as in Example XVI | | | | | |

[a]$N_2O_4$ slowly transferred to reaction solution at 0° C using $O_2$ as carrier gas.
[b]Graft reaction carried out under $N_2$ and after $O_2$ in system was replaced with $N_2$.
[c]Methyl methacrylate.
[d]See Example II for description of EPsyn 55.
[e]See Example I for description of EPsyn 40-A.
[f]Butyl methacrylate.

EXAMPLES XVIII-XX

In this series the grafting of butyl methacrylate, lauryl methacrylate and a mixture of lauryl methacrylate and butyl methacrylate, respectively, to an ethylene/- propylene/5-ethylidene-2-norbornene terpolymer having a molecular weight of about 76,000 (EPsyn 40-A) was demonstrated. The nitrooxidation step (first stage reaction) was conducted by stirring a solution of the polymer (9.4 weight percent in heptane) and dinitrogen tetroxide (about $1.0 \times 10^{-4}$ mole per gram of polymer) for five minutes at 0°-5° under an oxygen atmosphere. The acrylate monomer (10 ml/g polymer) was added to the reaction solution, the system was placed under a nitrogen atmosphere and heated to bring about the second stage polymerization and graft reaction. Recovery of the graft copolymer was accomplished by adding methanol to the reaction mixture to precipitate the graft copolymer which was purified by dissolution in benzene and re-precipitation with methanol. Other pertinent details relating to these three examples are found in Table 4.

TABLE 4
METHACRYLATE GRAFT COPOLYMERS

| Ex. | Monomer | Graft Conditions Temp (°C) | Time (Hr) | Monomer Conversion (Percent) | Polymer Weight Increase (Percent) |
|---|---|---|---|---|---|
| XVIII | BMA[1] | 100 | 7 | 34.0 | 306 |
| XIX | LMA[1] | 100 | 7 | 45.0 | 400 |
| XX | LMA-BMA[2] | 80 | 5 | 20.0 | 180 |

[1]BMA and LMA stand for butyl and lauryl methacrylates, respectively.
[2]LMA-BMA molar ratio of 1.47:1.

EXAMPLE XXI

The procedure for this example of the nitrooxida-and graft reactions of EPsyn 40-A (an ethylene-propylene-dene-2-norbornene terpolymer of molecular weight 76,000) was similar to the above Example XII for nitration and graft of EPsyn 55 except that the run was made in n-decane (70 ml; not stripped) and the system was placed under oxygen prior to addition of $N_2O_4$ (15 ml gaseous measure). After addition of lauryl methacrylate (50 ml), the system was placed under nitrogen and the solution was heated at 120° C. for 7 hours. n-Decane (25 ml) was added after 35 minutes at 120° C. to reduce viscosity. The product (34.5 g., after drying in vacuo) was precipitated by addition of 400 ml of methanol.

The graft copolymers of this invention may be utilized to prepare rod, sheet and parts such as horn buttons, instrument panels and medallions, safety guards, brush backs, costume jewelry, decorative parts, parts for home appliances, reinforced plastics, etc. with high tensile and impact strengths, by extrusion or molding at pressures ranging from about 500 to 15,000 psi or more at temperatures of from about 100° to about 250° C. Lubricants, plasticizers, modifiers, fillers, coloring matter may be added to the copolymer compositions as required as will be appreciated by those skilled in the art. In general, the graft copolymers of this invention can be employed whenever impact-resistant resins (e.g., ABS resins, high-impact polystyrene) are now used. When used in place of resins containing SBR or nitrile rubbers, they yield products with improved againg and ozone resistance.

The acrylate graft copolymers of this invention can be utilized to prepare reinforced, thermoplastic compositions comprising a polyolefin such as polyethylene, a reinforcing agent and a minor amount of the acrylate graft copolymer. Such novel, reinforced, thermoplastic compositions are prepared by treating the reinforcing materials directly with the acrylate graft copolymer itself or by contacting the reinforcement with a solution of the acrylate graft copolymer in an inert liquid and afterwards, for example, milling the thus-treated reinforcing material into a polyolefin to form a reinforced thermoplastic composition of improved physical properties. The reinforcement materials are treated in such a manner that they retain on their surfaces a coating of the acrylate graft copolymer.

It has been found that reinforced polyolefin compositions can be prepared utilizing the acrylate graft copolymers which exhibit tensile strengths substantially greater than compositions comprising only the polyolefin and the reinforcing agent.

A dual function is performed by the reinforcing agents in the finished compositions. Such materials serve as inexpensive diluents for the polymer and thus lower the cost of the final product. Most important, however, is that these reinforcing agents when utilized in the novel compositions of this invention produce finished compositions with physical properties are substantially superior to those of unreinforced polymers thus permitting their use in a number of applications heretofore unsuited for such materials.

Polyolefins which may be employed in preparing the reinforced thermoplastic compositions include polyethylene, polypropylene, polybutene, polypentene, polyhexene and isomers thereof. Mixtures of these olefin polmyers can also be utilized in preparing the novel compositions of this invention. Both high density and low density polyolefins, in general, are suitable for use in the novel thermoplastic compositions. In the specification the phrase "High Density Polyethylene" (abbreviated HDPE) refers to polyethylene having a density of about 0.95 to about 0.97 g/cc. while the phrase "Low Density Polyethylene" (abbreviated LDPE) relates to polyethylene having a density of about 0.91 to about 0.94 g/cc.

A wide variety of reinforcing materials can be utilized in preparing the compositions of this invention including alpha-cellulose, cellulosic fibers such as jute and sisal, and siliceous minerals, such as mineral silicates, and other siliceous materials. Synethetically prepared siliceous materials are also useful, such as fume silica and silica obtained by evaporation of silica sol. Examples of other useful reinforcing agents include quartz and other forms of silica such as silica gel, glass fiber, cristobalite, etc., mineral silicates such as wollastonite, mullite, sillimanite, asbestos fiber such as chrysotile while is a hydrated magnesium silicate, crocidolite, other calcium magnesium silicates, fosterite, a magnesium silicate, and clays such as kaolinite, bentonite, montmorillonite, saponite, attapulgite, etc. The most desirable fibrous reinforcing agents include glass fiber and alpha-cellulose. Mixtures of the various reinforcing agents may be employed, if desired.

A wide variety of glass fibers can be employed in preparing the novel compositions of this invention including yarns, rovings, chopped strand, etc. Chopped stand having lengths ranging from ⅛ to 2 inches or more with diameters ranging from about 0.00012 to about 0.00075 inches or more is an especially useful reinforcement material.

The amount of reinforcing agent utilized can be varied over a wide range with the maximum content being limited primarily by the ability of the polymer to bind the reinforcing medium into a cohesive mass. Thus, reinforced polymeric compositions of this invention can be prepared containing as much as 35 to about 45 percent by weight of the reinforcing agent.

With regard to the lower range of the amount of reinforcing material, this is limited only insofar as it is necessary to have sufficient reinforcement present to effect an improvement in physical properties of the polymeric composition. For example, concentrations as low as about 5 to about 10 percent by weight based on the reinforced thermoplastic composition can be employed, if desired. Preferably, the concentrations of the reinforcing material in the finished, reinforced thermoplastic composition will be from about 10 to about 40 percent by weight.

The particle size distribution of the granular reinforcement materials can be varied widely and generally particle sizes which will pass a 60 mesh screen (250 microns in the smallest dimension) are small enough to be used in the compositions of this invention, although particles as large as 1,000 microns (18 mesh) can also be employed.

Introduction of the reinforcing agent into the polyolefin base can be accomplished in an internal mixer, such as a Banbury-type mixer, a screw extruder or an external mixer, such as a differential roll mill.

As previously pointed out, the reinforcing materials can be treated with the acrylate graft copolymer or mixtures of these copolymers in such a manner that the said agent retains directly on its surface a coating of the copolymer. This can be carried out by treating the reinforcing agent with molten acrylate graft copolymer itself or by contacting the reinforcement material with a hot (i.e., at about 80° to about 120° C.) solution of the copolymer in an inert liquid, such as monochlorobenzene, toluene or xylene. Generally, the concentration of the copolymer in the solution will range from about 0.05 to about 20 grams per liter or more. After the reinforcing agent and the copolymer or copolymer solution have been thoroughly mixed, preferably at high speed, the treated reinforcing agent can be separated from any excess of the copolymer or from the solution of the copolymer by various methods, such as by decantation or by filtering. Subsequently, in the case in which a solvent is employed, the treated reinforcing agent is dried to remove excess solvent, preferably at room temperature or at a slightly elevated temperature in a vacuum oven. Afterwards, the reinforcing agent having coated on its surface a small amount of the acrylate graft copolymer (i.e., about 0.05 to about 0.5 weight percent) can be incorporated in the polyolefin composition by any of several methods well known in the art such as by using an inert mixer, or by employing a differential roll mill, etc.

If desired, when glass fiber is utilized as the reinforcing material, it can first be treated with a silane-type coupling agent and then contacted with molten acrylate graft copolymer or a solution of the copolymer in an inert solvent in the manner previously described.

Reinforced thermoplastic compositions of this invention can be fabricated by molding techniques such as compression or injection molding, by calendering or by extrusion, etc. The improved physical properties of these reinforced thermoplastic composition permit their use in many applications in which the unreinforced materials are entirely unsuitable, such as for the fabrication of tables, chairs, drawers and other furniture and furniture components, heavy duty equipment housing, automobile parts and building construction components. Further, the novel compositions are highly useful in applications in which unreinforced polymers have been employed but where increased strength and rigidity are desirable features. The reinforced thermoplastic compositions can contain other materials in addition to the polyolefin, the acrylate graft copolymer and the reinforcement agents mentioned previously, such as dyes, heat stabilizers, light stabilizers, antioxidants and other modifiers provided the amount of the additional modifier is such as to not produce an unduly adverse effect upon the final properties of the thermoplastic composition.

POLYETHYLENE REINFORCED WITH GLASS FIBER (A)

Coated glass fiber, i.e., ½-inch chopped glass fiber specimens (Code 112-glass micro fiber having an average diameter of from 2.6 to 3.8 microns, random lengths) is soaked in a solution of the acrylate graft copolymer of Example I in hot benzene. The solutions and the fiber mixtures were cooled to about room temperature at which point the excess liquid was decanted and the wet fibers were then dried in a vacuum oven at 60° C.

Blends of the low density polyethylene together with 20 weight percent of glass fiber reinforcement coated with the above-described copolymers are then prepared on a two-roll mill. Such blends are made by pouring the low density polyethylene pellets into the nip between the hot rolls in increments until the copolymer was molten on the rolls. The fiber reinforcement is added to the nip and the resulting composite is cut off the rolls and fed back in at right angles frequently to facilitate mixing and hinder the orientation of the fibers. After 15 minutes, the crepe is cut off and removed from the mill in the form of a long flat sheet. Samples tested exhibit substantial tensile strength values over that of the unreinforced polyethylene.

POLYPROPYLENE REINFORCED WITH ALPHA CELLULOSE (B)

A composition is prepared using polypropylene (density 0.92, molecular weight 45,000) and 15 weight percent of alpha-cellulose (100 mesh flock) coated with the acrylate graft copolymer of Example II in the same manner as described above in the preparation of Composition (A). Preparation of the reinforced composition is accomplished by milling the alpha-cellulose coated with the acrylate graft copolymer into the polypropylene on the two-roll mill. The resulting reinforced composition exhibits a substantially improved tensile strength value over that of the polypropylene alone.

POLYETHYLENE REINFORCED WITH ASBESTOS FIBER (C)

Blends of high density polyethylene (density (0.96) together with 15 weight percent of chrysotile fibers of random length (0.75 to 1.2 microns in diameter) coated with the graft copolymer of Example IV are prepared. Preparation of the coated asbestos fibers is accomplished in the same manner as described above with regard to Reinforced Composition A except that the solvent employed is toluene. The blends likewise are made in the same manner using the same equipment as utilized in preparing Composition A. These reinforced plastic compositions exhibit a high tensile strength.

What is claimed is:

1. A reinforced thermoplastic composition comprising from about 60 to about 90 percent by weight of of a polyolefin and uniformly dispersed throughout the said polyolefin polymer from 10 to about 40 percent by weight of a reinforcing material selected from the group consisting of alpha-cellulose and a siliceous reinforcing agent, the said reinforcing material being coated with a graft copolymer comprising a backbone polymer having a hydrocarbon chain portion and a plurality of pendant hydrocarbon groups each containing a moiety of the formula:

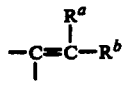

wherein $R^a$ and $R^b$ are independently selected from the group consisting of hydrogen and alkyl of from 1 to 16 inclusive carbon atoms, having grafted thereon an acrylate of the formula:

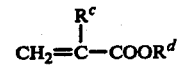

wherein $R^c$ is selected from the group consisting of hydrogen and alkyl of from 1 to 3 inclusive carbon atoms and $R^d$ is alkyl of from 1 to 30 inclusive carbon atoms, to form a graft copolymer, wherein the said backbone polymer is 1,2-polybutadiene and wherein about 5 to about 80 percent by weight of the graft copolymer is 1,2-polybutadiene with the balance being the said acrylate.

2. The thermoplastic composition of claim 1 wherein the said polyolefin is polyethylene.

3. The thermoplastic composition of claim 1 wherein the said polyolefin is polypropylene.

4. The thermoplastic composition of claim 1 wherein the said reinforcing material is a siliceous reinforcing agent selected from the group consisting of fume silica, quartz, silica gel, glass fiber, cristobalite, wollastonite, chrysotile, crocidolite, and kaolinite.

* * * * *